United States Patent
Wakita et al.

(10) Patent No.: US 8,351,009 B2
(45) Date of Patent: Jan. 8, 2013

(54) DISPLAY PANEL, LIQUID CRYSTAL DISPLAY DEVICE AND DRIVE-CIRCUIT-MOUNTED BOARD

(75) Inventors: Yasuhiro Wakita, Osaka (JP); Seiji Muraoka, Osaka (JP); Hidetaka Mizumaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 728 days.

(21) Appl. No.: 12/488,625

(22) Filed: Jun. 22, 2009

(65) Prior Publication Data

US 2010/0321623 A1  Dec. 23, 2010

(51) Int. Cl.
*G02F 1/1345* (2006.01)

(52) U.S. Cl. ......... 349/149; 349/150; 349/151; 349/152

(58) Field of Classification Search .......... 349/149, 349/150, 151, 152
See application file for complete search history.

(56) References Cited

U.S. PATENT DOCUMENTS

| | | | | |
|---|---|---|---|---|
| 7,372,514 B2 * | 5/2008 | Matsumoto et al. | ............ | 349/55 |
| 7,710,739 B2 * | 5/2010 | Kimura et al. | ................ | 361/767 |
| 2006/0284821 A1 * | 12/2006 | Takenaka | ....................... | 345/100 |

FOREIGN PATENT DOCUMENTS

| | | | |
|---|---|---|---|
| JP | 5-183247 A | | 7/1993 |
| JP | 6-59269 A | | 3/1994 |
| JP | 6-250199 A | | 9/1994 |
| JP | 06250199 A | * | 9/1994 |
| JP | 2001-156417 A | | 6/2001 |
| JP | 2001156417 A | * | 6/2001 |
| JP | 2004-184839 A | | 7/2004 |
| JP | 2004184839 A | * | 7/2004 |
| JP | 2004-259750 A | | 9/2004 |
| JP | 2006-350064 A | | 12/2006 |

* cited by examiner

*Primary Examiner* — Mike Qi

(74) *Attorney, Agent, or Firm* — Birch, Stewart, Kolasch & Birch, LLP

(57) ABSTRACT

A display panel is connected to a wiring-mounted board on which a signal supply wiring that supplies wiring supplies signals for driving the display panel is mounted. The wiring-mounted board has (i) first and second wires extending toward the display panel, and (ii) first and second terminals that are connected to the first and second wires, respectively. The display panel has a first short-circuit wire that is connected to the first and second wires at a connecting part of the display panel and the wiring-mounted board, so as to short-circuit the first and second wires.

10 Claims, 6 Drawing Sheets

DISPLAY PANEL, LIQUID CRYSTAL DISPLAY DEVICE AND DRIVE-CIRCUIT-MOUNTED BOARD

This Nonprovisional application hereby incorporate by reference the entire contents of Patent Application No. 2007-077769 filed in Japan on Mar. 23, 2007.

TECHNICAL FIELD

The present invention relates to a display panel connected to a wiring-mounted board on which wiring that supplies a signal for driving the display panel is mounted, a liquid crystal display device including such a display panel, and a drive-circuit-mounted board on which a semiconductor integrated circuit for driving the display panel is mounted.

BACKGROUND ART

A flat type display apparatus such as a liquid crystal display device has become widespread due to its easiness in achievement of reduction in thickness. Such a display apparatus includes a display panel containing a large number of pixels. The display panel receives, from a drive circuit, signals for driving the pixels. This drive circuit is integrated, and is provided as a packaged arrangement such as a COF (Chip On Film). Such drive circuit is provided externally to the display panel. Alternatively, the drive circuit is directly mounted on a glass substrate of the display panel, as a COG (Chip On Glass) form. The signals for driving the pixels are provided to the drive circuit thus mounted on the glass substrate via wiring mounted on an FPC (Flexible Printed Circuit) connected to the display panel.

In order to ensure reliability of signal communication to the display panel, it is required for the COF and the FPC to be securely connected to the display panel. As a technique for improving reliability of such a connection, a technique for structurally reinforcing the FPC is disclosed in Japanese Unexamined Patent Publication No. 183247/1993 (Tokukaihei 5-183247; published on Jul. 23, 1993), for example. In this technique, the FPC is reinforced at both outer side end sections which receive stress, by providing a reinforcement member that has no electrical connection.

Verification of the reliability of the connection is also carried out by a test conducted after the COF or the FPC is connected to the display panel. A mainstream of such a test is an impression test carried out at a connecting part. The impression test examines, through an image, a state of a thermally compressed impression part, by an automated machine incorporating a microscope. More specifically, a state of the impression part such as a depth and a width are analyzed by use of a photographed image.

The flat type display apparatus are becoming used as a display section for various machines, due to its advantage that the display apparatus can be arranged so as to be thin in thickness. For example, use of the flat type display apparatus in machines such as an onboard display apparatus and a display apparatus of a controlling apparatus have been promoted. In such fields of use, the machines which include the flat type display apparatus are often placed under a harsh environment. In a case of a passenger car, the display apparatus is subject to vibration, high and low temperatures, and the like. The controlling apparatus that is used in factories and the like are also often placed in a similar environment as with the passenger car.

Use of the flat type display apparatus under such a harsh environment causes film base material used in the COF and FPC to receive stress. Therefore, as compared to a case where the flat type display apparatus is used under a normal usage environment, there is a high possibility that the film base material (particularly at a connecting part with the display panel) is to break.

As described above, structural reinforcement of the FPC can reduce the occurrence of breakage of the FPC that is caused by stress. However, it can also be fully considered that, under the harsh usage environment, the reinforcement may still not prevent damage to the FPC given due to stress that has been received for a long term. As a result, in a case where the FPC actually breaks, there is a possibility that the display panel cannot be able to carry out a display due to a disconnection thus occurred to the FPC. Such a situation hinders operation of the passenger car and the controlling apparatus.

Moreover, although the impression test can verify the reliability of the connection during a manufacturing step of the display apparatus, verification cannot be made once the display apparatus is marketed as a product. Therefore, even if the COF and the FPC are close to breakage as a result of continuous use of the display apparatus under the foregoing harsh environment, this state cannot be verified. Consequently, further continuous use of the display apparatus in such state results in breakage of the COF and the FPC. As a result, display can no longer be carried out by the display panel.

SUMMARY OF INVENTION

An object of the present invention is to provide an arrangement capable of checking a connection state between a display panel and a flexible mounting board (e.g. COF and FPC), not only during manufacture but also during use thereof.

In order to attain the object, a display panel of the present invention is a display panel connected to a wiring-mounted board on which signal supply wiring that supplies signals for driving the display panel is mounted, the wiring-mounted board having (i) first and second wires which extend toward the display panel, and (ii) first and second terminals which are connected to the first and second wires, respectively, and the display panel having a first short-circuit wire which is connected to the first and second wires, at a connecting part of the display panel and the wiring-mounted board, so as to short-circuit the first and second wires.

In the arrangement, first and second wires are connected so as to form one wire, via a first short-circuit wire. In such a state, assumption of (i) a breakage state of the wiring-mounted substrate and (ii) a connection state between the display panel and the wiring-mounting substrate are possible, by inputting a signal from a first terminal and checking a state of the signal that appears at a second terminal. The assumption can similarly be made by carrying out the following comparison: (i) a normal resistance of the first and second wires connected so as to form one wire is measured between the first and second terminals in advance; and (ii) a resistance of the wiring that is similarly measured at a state in which the wiring has changed over time is compared to the normal resistance.

For a fuller understanding of the nature and advantages of the invention, reference should be made to the ensuing detailed description taken in conjunction with the accompanying drawings.

BRIEF DESCRIPTION OF DRAWINGS

FIG. 1 is plan view illustrating a display panel according to First Embodiment of the present invention and an FPC which is connected to the display panel.

FIG. 2(a) is a plan view illustrating an arrangement of the display panel.

FIG. 2(b) is a plan view illustrating an arrangement of the FPC.

FIG. 3 is a plan view illustrating a display panel according to Second Embodiment of the present invention and a PWB which is connected to the display panel.

FIG. 4(a)

FIG. 4(a) is a plan view illustrating an arrangement of the display panel illustrated in FIG. 3.

FIG. 4(b) is a plan view illustrating an arrangement of the PWB illustrated in FIG. 3.

FIG. 5 is a plan view illustrating an arrangement of a modification of Second Embodiment.

FIG. 6 is a block diagram illustrating an arrangement of a liquid crystal display device according to Third Embodiment.

DESCRIPTION OF EMBODIMENTS

One embodiment of the present invention is described below with reference to FIGS. 1 through 6.

First Embodiment

Figure 1:
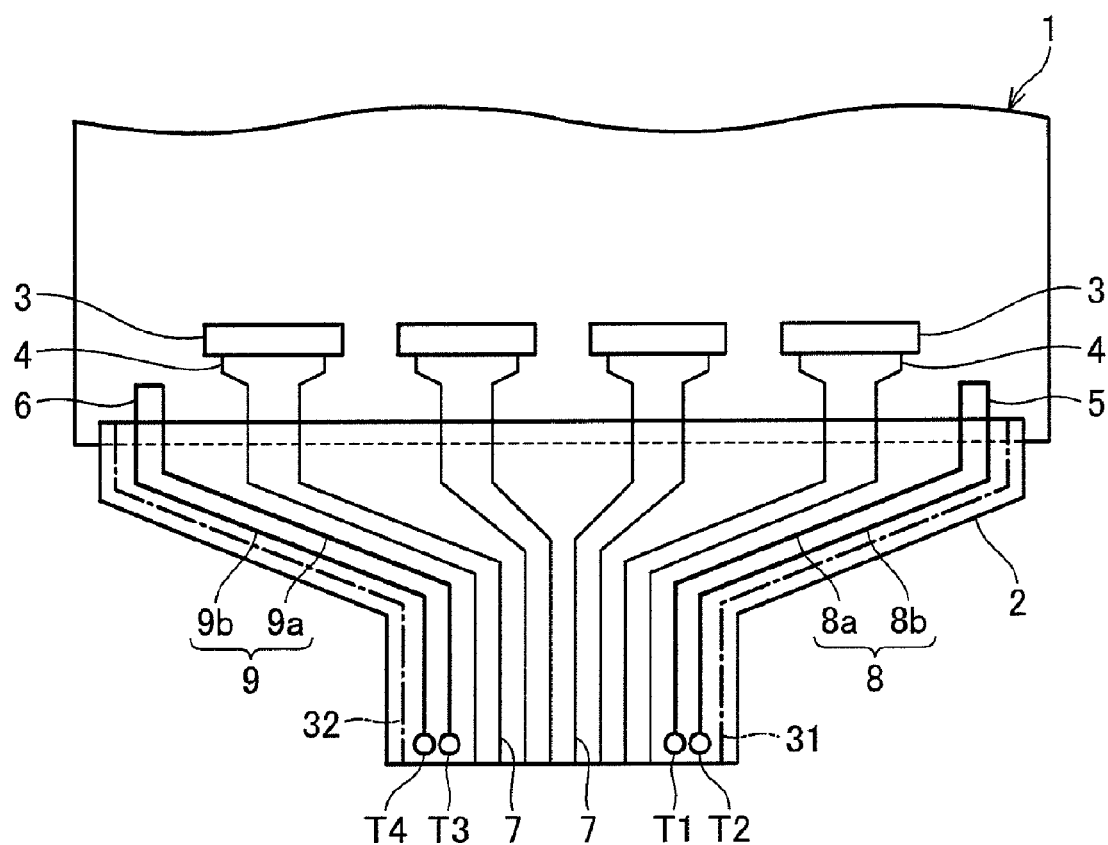
FIG. 1
Figure 2:
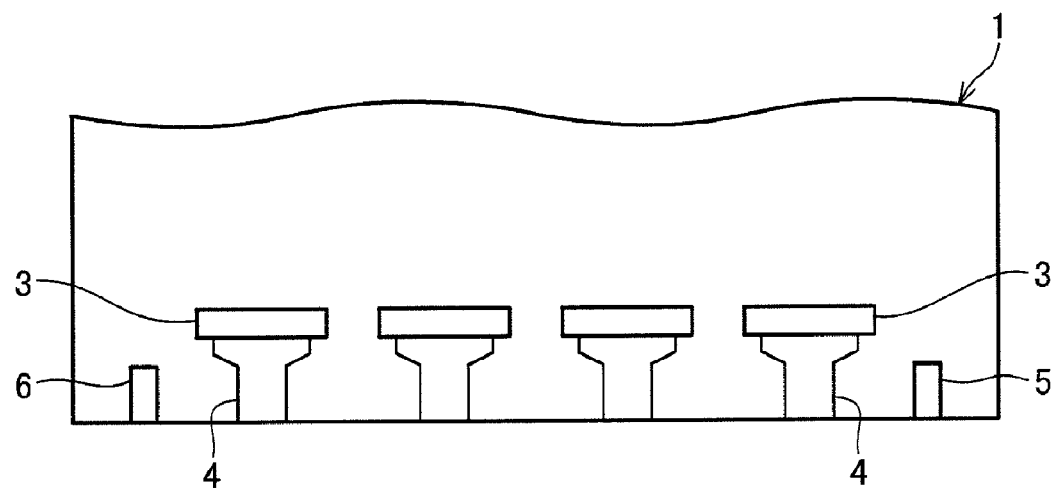
FIG. 2(a)
FIG. 2(b)
Figure 2:
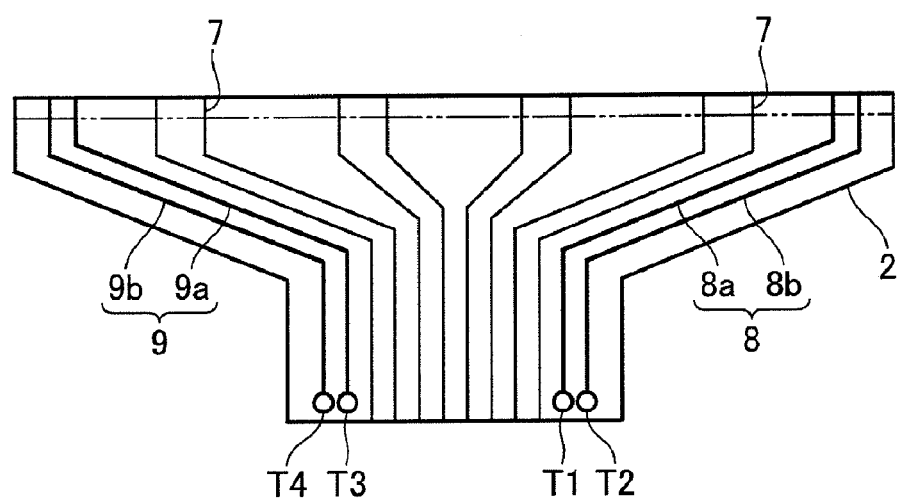

FIG. 1 illustrates a state (display panel module) of a display panel 1 according to the present embodiment. The display panel 1 is connected to an FPC 2. FIGS. 2(a) and 2(b) illustrate the display panel 1 and the FPC 2 in unconnected states, respectively.

As illustrated in FIG. 1, a plurality of driver chips 3 are mounted along one side of the display panel 1 by a COG technique. The driver chips 3 are integrated drive circuits, which provide drive signals to a plurality of pixels included in the display panel 1 for driving the pixels. Selection signals for selecting display data and a scanning line, and other signals are provided as the drive signals.

Various signals in accordance with driving methods of the driver chips 3 are inputted to the driver chips 3, such as a clock for controlling timing for outputting display data or controlling timing of the selection signal, and the like. In order to receive such signals, wiring patterns 4 are provided on the display panel 1 on a side on which the driver chips 3 are mounted. The wiring patterns 4 include a plurality of wires (not illustrated) for supplying a plurality of signals to the driver chips 3 from the FPC 2.

Moreover, on the surface of the display panel 1 on which the driver chips 3 are mounted, short-circuit wires 5 and 6 are respectively provided on both end sections of a part on which the driver chips 3 are provided. The short-circuit wires 5 and 6 are later described in detail.

The FPC 2 is made of film base material such as polyimide or the like, and wiring patterns 7 are formed on this film base material. The wiring patterns 7 are provided so as to correspond to the driver chips 3, so that the signals are provided to the driver chips 3. As with the wiring patterns 4, the wiring patterns 7 include a plurality of wires (not illustrated).

The FPC 2 is connected to the display panel 1 via an ACF (Anisotropic Conductive Film), in a state in which a connecting end section of the FPC 2 is placed on a connecting end section of the display panel 1. This causes the wiring patterns 4 and 7 to be electrically connected to each other.

As illustrated in FIG. 2(b), the FPC 2 has test wiring sections 8 and 9. The test wiring sections 8 and 9 are provided in the vicinity of both side edges of the FPC 2, respectively, so as to sandwich all of the wiring patterns 7. The test wiring section 8 is made of two wires 8a and 8b provided parallel to each other. The test wiring section 9 is made of two wires 9a and 9b provided parallel to each other. One end of each of the wires 8a, 8b, 9a, and 9b extend toward the connecting end section of the FPC 2. The other end of each of the wires 8a, 8b, 9a and 9b are connected to terminals T1 to T4, respectively, which terminals T1 to T4 are provided at an input side end section of the FPC 2.

As illustrated in FIG. 2(a), the short-circuit wires 5 and 6 are provided in a U-shape so as to form a rectangular shape. Both ends of the short-circuit wires 5 and 6 extend up to the connecting end section of the display panel 1. Accordingly, as illustrated in FIG. 1, one end of the short-circuit wire 5 is connected to the wire 8a, and the other end of the short-circuit wire 5 is connected to the wire 8b. Moreover, one end of the short-circuit wire 6 is connected to the wire 9a, and the other end of the short-circuit wire 6 is connected to the wire 9b. At this state, the wires 8a and 8b are connected so as to form one wire via the short-circuit wire 5, and the wires 9a and 9b are connected so as to form one wire via the short-circuit wire 6.

In this state, a test signal having an arbitrary waveform is inputted from the terminals T1 and T3, so as to monitor a signal that appears at the terminals T2 and T4. This allows assumption of (i) a breakage state of the FPC 2 and (ii) a connection state between the display panel 1 and the FPC 2.

For example, if the signal that appears at the terminals T2 and T4 has a substantially same waveform as the signal thus inputted, the test wiring sections 8 and 9 properly transmit the signal. Hence, the connection of the display panel 1 and the FPC 2 is normal, and is thus considered that breakage has not occurred to the FPC 2, at least in a part on which the test wiring sections 8 and 9 are provided.

If a signal does not appear at one or both of the terminals T2 and T4, there is a high possibility that the test wiring section 8 and/or 9 at which the signal does not appear is disconnected, or that connection states between the test wiring sections 8 and 9 and the short-circuit wires 5 and 6 have degraded. Consequently, in this case, there may be a case of a breakage occurring at an edge section (side end section) of the FPC 2, or occurrence of a poor connection between the display panel 1 and the FPC 2.

Further, if the waveform of the signal that appears at one or both of the terminals T2 and T4 is blunter as compared to the signal thus inputted, there is a possibility that a resistance of the test wiring sections 8 and 9 has increased due to a breakage of the test wiring sections 8 and 9, or the like.

Moreover, the following comparisons may be carried out: (i) comparing between a resistance of a wiring path including the test wiring section 8 and the short-circuit wire 5 and a normal resistance of such wiring path measured in advance; and (ii) comparing between a resistance of a wiring path including the test wiring section 9 and the short-circuit wire 6 and a normal resistance of that wiring path measured in advance. Carrying out these comparisons also allow the assumption of (i) the breakage state of the FPC 2 and (ii) the connection state between the display panel 1 and the FPC 2. A remarkably larger resistance of the wiring path as compared to a normal value gives an assumption that a state of the wiring path is close to disconnection. The terminals T1 to T4 are usable for measurement of the resistance.

As such, in the present embodiment, the display panel 1 has the short-circuit wires 5 and 6, and the FPC 2 has the test wiring sections 8 and 9; the short-circuit wire 5 is connected to the test wiring section 8, and the short-circuit wire 6 is connected to the test wiring section 9. Moreover, the ends of the test wiring section 8 are connected to the terminals T1 and T2, respectively, and the ends of the test wiring section 9 are connected to the terminals T3 and T4, respectively. This thus allows easy assumption of (i) the breakage state of the FPC 2, particularly on both end parts which readily receive stress, and (ii) the connection state between the display panel 1 and the FPC 2, by checking a state of an output signal from the terminals T2 and T4 with respect to input signals from the terminals T1 and T3, during use of a display apparatus which includes the display panel 1. Moreover, a similar assumption can be made by carrying out the following comparisons: (i) comparing between a resistance between the terminals T1 and T2 and its normal resistance; and (ii) comparing between a resistance between the terminals T3 and T4 and its normal resistance.

The present embodiment explains an arrangement which provides the test wiring sections 8 and 9 in a vicinity of both side edges of the FPC 2, respectively. However, if there is a limitation to a layout of a pin in the FPC 2, just one of the test wiring sections 8 and 9 may be provided.

The present embodiment may further have dummy wires 31 and 32 on the FPC 2, as illustrated by alternate long and short dash lines in FIG. 1. The dummy wire 31 is provided between the test wiring section 8 and one side edge of the FPC 2. The dummy wire 32 is provided between the test wiring section 9 and the other side edge of the FPC 2.

The dummy wires 31 and 32 are usually provided as independent wires that are not electrically connected to any wires of the display panel 1 or any external wires. Such dummy wires 31 and 32 have a function of reinforcing the FPC 2. Hence, it is possible to further improve strength of both side edges of the FPC 2.

Moreover, the dummy wires 31 and 32 may be electrically connected to a wire of the display panel 1 or an external wire, if necessary.

Second Embodiment

Figure 3:
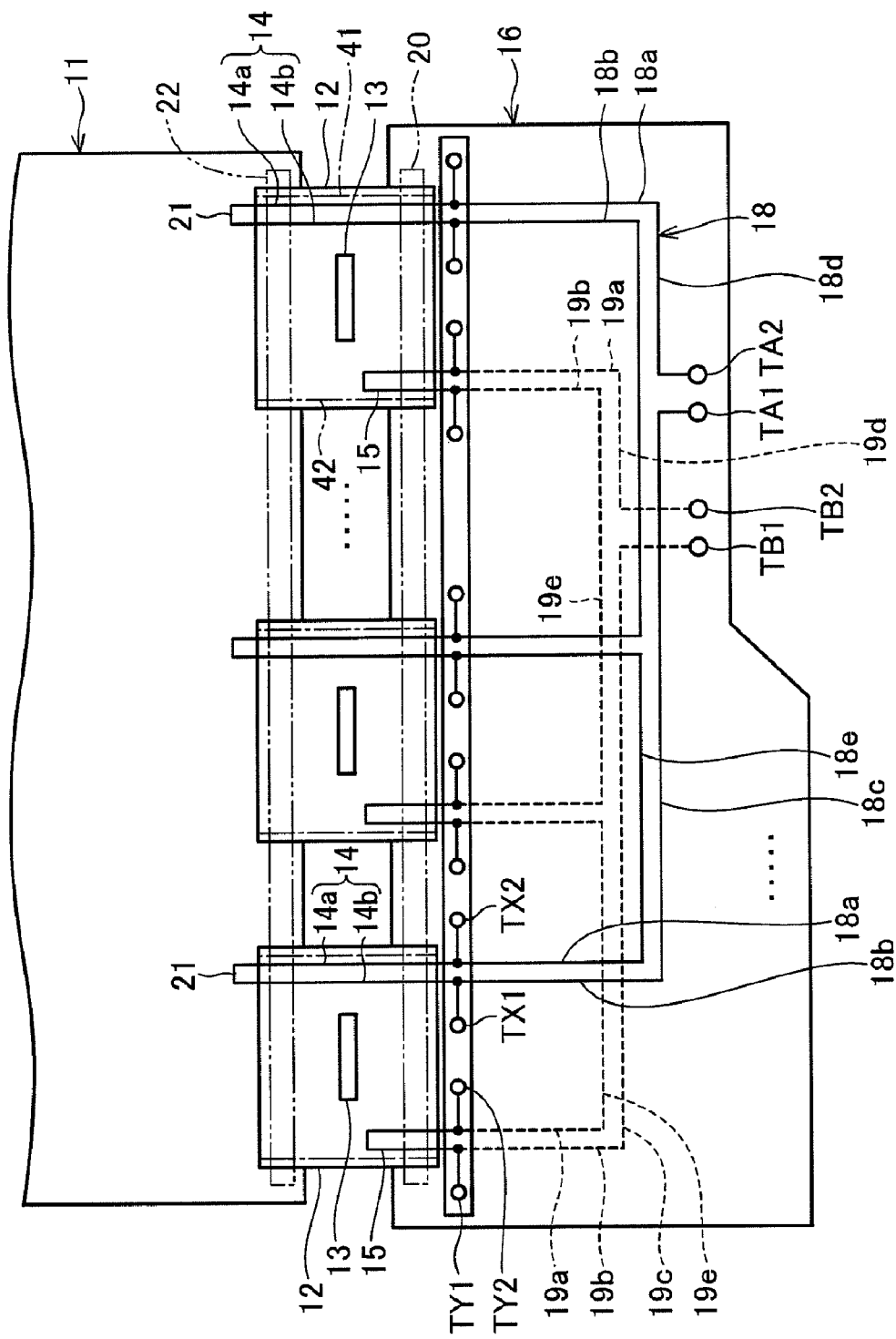
FIG. 3
Figure 4:
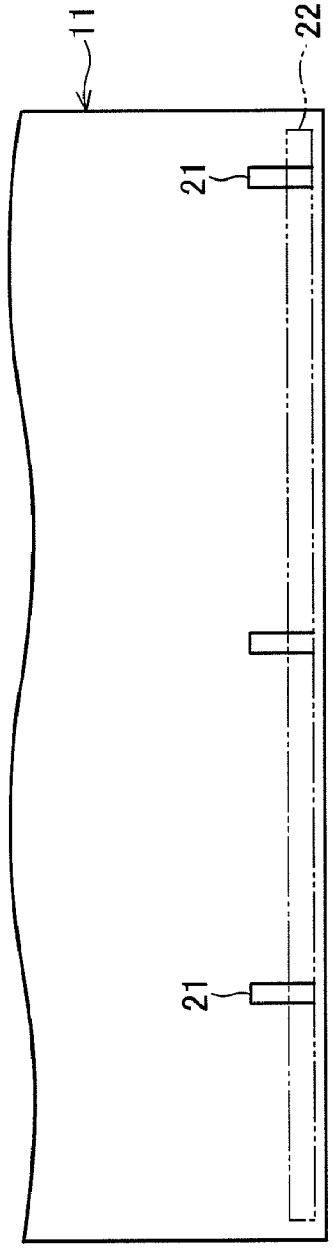
FIG. 4 (b)
Figure 4:
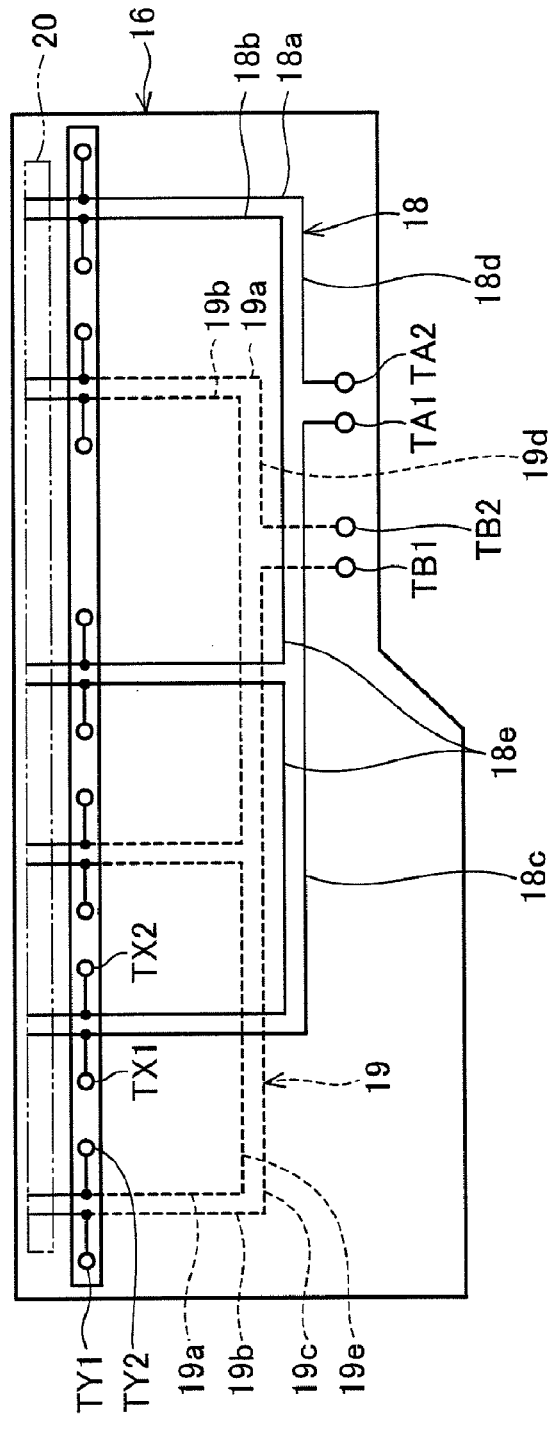

FIG. 3 illustrates a state (display panel module) of a PWB (Printed Wiring Board) 16 connected to a display panel 11 according to the present embodiment, via COFs 12. FIGS. 4(*a*) and 4(*b*) illustrate the display panel 11 and the PWB 16 in an unconnected state, respectively.

As illustrated in FIG. 3, a plurality of COFs 12 provided side by side are connected to the display panel 11 along one side of the display panel 11. Short-circuit wires 21 are provided at sections on which the COFs 12 are connected on the display panel 11. The short-circuit wires 21 are later explained in details.

Each of the COFs 12 has film base material made of polyimide or the like, on which a driver chip 13 and input and output wires (not illustrated) are mounted. The input wire is provided for transmitting an input signal from the PWB 16 to the driver chip 13. The output wire is provided for transmitting an input signal from the driver chip 13 to the display panel 11. The driver chip 13 is arranged as similar to the foregoing driver chips 3, and provides drive signals to a plurality of pixels included in the display panel 11, for driving the pixels.

The COFs 12 take a form of an SOF (System On Chip), a TCP (Tape Carrier Package), or the like. The SOF is arranged such that a chip is mounted on film base material made of polyimide or the like. Recently, the SOF is becoming widely spread as an integrated circuit component for driving, such as a liquid crystal driver. Such arrangement of the SOF allows providing wiring to a part on which the chip is to be mounted, different to the TCP on which a chip is mounted on an opening section of the film base material. Moreover, different to the TCP, the SOF does not have a slit that specifies a bending position. Thus, it is possible to bend the SOF at a desired position.

Each of the COFs 12 include a test wiring section 14 and a short-circuit wire 15. The test wiring section 14 includes two wires 14*a* and 14*b* provided parallel to each other. The wires 14*a* and 14*b* are provided on one side of the film base material of the COF 12 with respect to the driver chip 13, so as to connect the display panel 11 and the PWB 16. The short-circuit wire 15 is provided in a U-shape on the other side of the driver chip 13 that is provided on the film base material of each of the COF 12, so as to form a rectangular shape. Both ends of the short-circuit wire 15 extend toward the PWB 16, to connecting end sections of the COFs 12.

The display panel 11 is connected to the COFs 12 at a connecting section 22 via the ACF, in a state such that a connecting end section of the display panel 11 overlaps with connecting end sections of the COFs 12. Thus, the output wires of the COFs 12 and input wires (not illustrated) of the display panel 11 are electrically connected to each other.

As illustrated in FIG. 4(*a*), the short-circuit wires 21 are U-shaped so as to form a rectangular shape. Both ends of the short-circuit wires 21 extend toward the connecting end section of the display panel 11. One end of the short-circuit wires 21 are connected to respective wires 14*a*, and the other end of the short-circuit wires 21 are connected to respective wires 14*b*, as illustrated in FIG. 3. At this state, the wires 14*a* and 14*b* connect so as to form one wire via respective short-circuit wires 21.

The PWB 16 generates a timing signal required for driving the display panel 11, by use of a controller (not illustrated) installed in the PWB 16. Moreover, the PWB 16 has a wiring pattern (not illustrated) provided so as to correspond to each of the COF 12. The wiring pattern includes a plurality of wires (not illustrated) for transmitting timing signals to be supplied to the driver chips 13 of the COFs 12. The timing signals are prepared in accordance with driving methods, such as a clock for controlling a timing for outputting display data or for controlling a timing of a selection signal, and such timing signal is supplied from the controller (not illustrated) mounted on the PWB 16. The controller generates the timing signals based on externally supplied clock and various pulse signals.

Note that the controller may be provided externally to the PWB 16.

Moreover, as illustrated in FIG. 4(*b*), the PWB 16 includes: test wiring sections 18 and 19; terminals TA1, TA2, TB1 and TB2; and intermediate terminals TX1, TX2, TY1, and TY2. The test wiring section 18 includes a plurality of wires 18*a* and 18*b*, an input wire 18*c*, an output wire 18*d*, and common wires 18*e*. The test wiring section 19 includes a plurality of wires 19*a* and 19*b*, an input wire 19*c*, an output wire 19*d*, and common wires 19*e*.

One pair of the wires 18*a* and 18*b* is provided for each of the COFs 12. One end of the wires 18*a* is connected to respective wires 14*a*, and one end of the wires 18*b* is connected to respective wires 14*b*. The input wire 18*c* causes the terminal TA1 to be connected to one end of the wire 18*b* that is connected to a wire 14*b* of a COF 12 provided on one end (left end in Figure) of the PWB 16. The output wire 18*d* causes the terminal TA2 to be connected to the other end of a wire 18a that is connected to the wire 14a of a COF 12 provided on the other end (right end in Figure) of the PWB 16. Moreover, the common wires 18e cause adjacent wires 18a and 18b of adjacent pairs of the wires 18a and 18b to be connected to each other.

Similarly, one pair of wires 19a and 19b is provided for each of the COFs 12. One end of the wires 19a is connected to one end of respective short-circuit wires 15, and one end of the wires 19b is connected to the other end of the respective short-circuit wires 15. The input wire 19c causes the terminal TB1 to be connected to the other end of a wire 19b that is connected to one end of a short-circuit wire 15 of the COF 12 provided on one end (left end in Figure) of the PWB 16. The output wire 19d causes the terminal TB2 to be connected to the other end of the wire 19a that is connected to the other end of a short-circuit wire 15 in the COF 12 provided on the other end (right end in Figure) of the PWB 16. Moreover, the common wires 19e cause adjacent wires 19a and 19b of adjacent pairs of the wires 19a and 19b to be connected to each other.

The terminals TX1 and TX2 are connected to ends of the wires 18a and 18b on the COF 12 side, respectively. Similarly, the terminals TY1 and TY2 are connected to ends of the wires 19a and 19b on the COF 12 side, respectively.

The PWB 16 is connected to the COF 12 at a connection section 20 via the ACF, in such a manner that a connecting end section of the PWB 16 overlaps with a connecting end section of each of the COFs 12. Thus, the aforementioned input wires of each of the COFs 12 and the wiring pattern are electrically connected to each other.

Moreover, the test wiring sections 14 of the COFs 12 and the test wiring section 18 of the PWB 16 become electrically connected to each other. More specifically, the wires 18a and 18b of the PWB 16 are connected to respective wires 14a and 14b of corresponding COFs 12. Thus, the test wiring section 18, the test wiring sections 14 and the short-circuit wires 21 are connected so as to form one wire between the terminals TA1 and TA2.

Further, the short-circuit wires 15 of the COFs 12 and the test wiring section 19 of the PWB 16 are electrically connected to each other. More specifically, the wires 19a and 19b of the PWB 16 are connected to the ends of the short-circuit wires 15 of the corresponding COF 12s, respectively. Thus, the test wiring section 19 and the short-circuit wires 15 are connected so as to form one wire between the terminals TB1 and TB2.

In such a state, a test signal which has an arbitrary waveform is inputted from the terminals TA1 and TB1, and a signal that appears at the terminals TA2 and TB2 are monitored. This allows assumption of (i) a breakage state of the COF 12 and/or the PWB 16, (ii) a connection state between the display panel 11 and the COFs 12, and (iii) a connection state between the COFs 12 and the PWB 16.

For example, if the signal that appears at the terminals TA2 and TB2 are of a substantially same waveform as the signal thus inputted, the test wiring sections 14, 18, and 19 are properly transmitting the signal. Therefore, the connection between the display panel 11 and the COFs 12 and the connection between the COFs 12 and the PWB 16 are normal. As a result, it is possible to consider that no breakage has occurred to the COFs 12 and the PWB 16 in at least parts in which the test wiring sections 14, 18 and 19 are provided on the COFs 12 and the PWB 16.

If a signal does not appear at just the terminal TA2, there is a high possibility that the test wiring sections 14 and 18 itself are disconnected, or that the connection state between the test wiring sections 18 and 14 and/or the connection state between the test wiring sections 14 and the short-circuit wires 21 have degraded. Hence, in this case, there is a possibility of (i) a breakage in an edge section (end section in which the test wiring section 14 is provided) of the COFs 12, or (ii) occurrence of a poor connection between the COFs 12 and the PWB 16 and/or a poor connection between the display panel 11 and the COFs 12.

Moreover, if a signal does not appear at just the terminal TB2, there is a high possibility that the test wiring section 19 is disconnected, or that the connection state between the test wiring section 19 and the short-circuit wires 15 has degraded. Thus, in this case, there is a possibility of a breakage in an edge section (end section in which the short circuit wires 15 is provided) of the COFs 12, or occurrence of a poor connection between the COFs 12 and the PWB 16.

If the waveform of the signal that appears at just the terminal TA2 is blunter as compared to that of the signal thus inputted, there is a possibility that resistances of the test wiring sections 14 and 18 have increased due to the breakage of the test wiring sections 14 and 18, or the like. Moreover, if the waveform of the signal that appears at just the terminal TB2 is blunter as compared to that of the signal thus inputted, there is a possibility that a resistance of the test wiring section 19 has increased due to the breakage of the test wiring section 19.

Moreover, the following comparisons may be carried out: (i) comparing between a resistance of a wiring path including the test wiring sections 14 and 18 and the short-circuit wires 21 and a normal resistance of such wiring path measured in advance; and (ii) comparing between a resistance of a wiring path including the test wiring section 19 and the short-circuit wires 15 and a normal resistance of that wiring path measured in advance. Carrying out these comparisons also allow the assumption of (i) the breakage state of the COFs 12 and (ii) the connection state between the display panel 11 and the COFs 12. A remarkably larger resistance of the wiring path as compared to a normal value gives an assumption that a state of the wiring path is close to disconnection. The terminals TA1, TA2, TB1 and TB2 are usable for measurement of the resistance.

Moreover, measurement of the resistance between the terminal TX1 and the TX2 and the resistance between the terminal TY1 and TY2 allows verification of whether the aforementioned sections are broken or have poor connection at the connecting sections, in each of the COFs 12.

As such, in the present embodiment, the display panel 11 has the short-circuit wires 21, and the COFs 12 have the test wiring sections 14 and the short-circuit wires 15. The test wiring sections 14 cause the test wiring section 18 to be connected the short-circuit wires 21, and the short-circuit wires 15 are connected to the test wiring section 19. The terminals TA1 and TA2 are connected to the ends of the test wiring section 18, respectively, and the terminals TB1 and TB2 are connected to the ends of the test wiring section 19, respectively. This arrangement allows easy assumption of (i) a breakage state of the COFs 12, (ii) the connection state between the display panel 11 and the COFs 12 and (iii) the connection state between the COFs 12 and the PWB 16, by checking a state of outputted signals from the terminals TA2 and TB2 with respect to inputted signals from the terminals TA1 and TB1, during use of the display apparatus including the display panel 11. Moreover, a similar assumption can be made by carrying out the following comparisons: (i) comparing between a resistance between the terminals TA1 and TA2 and its normal resistance; and (ii) comparing between a resistance between the terminals TB1 and TB2 and its normal resistance.

Figure 5:
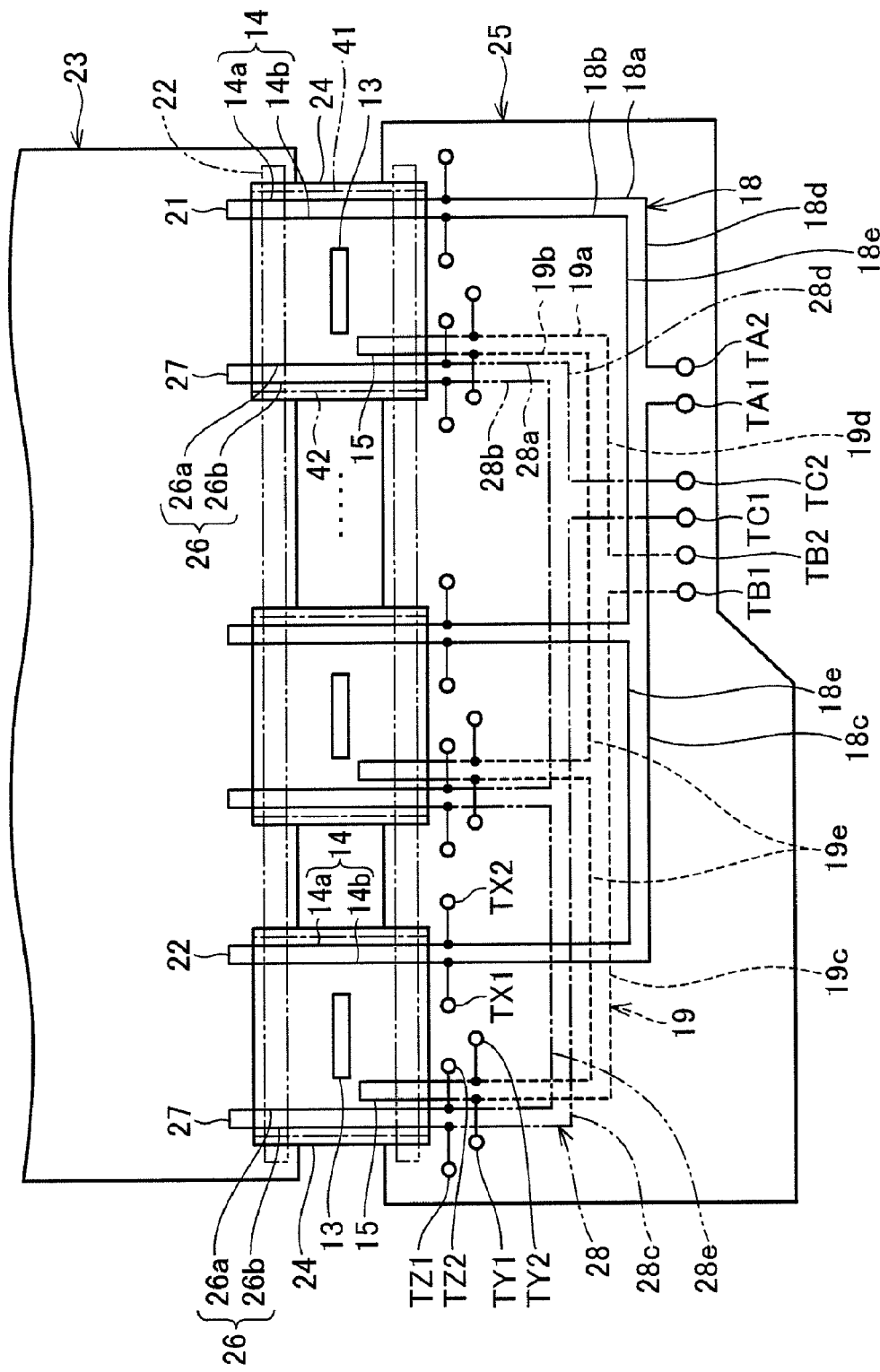
FIG. 5

The following description explains a modification of the present embodiment. FIG. 5 is a plan view illustrating the modification.

As illustrated in FIG. 5, the present modification includes a display panel 23, COFs 24 and a PWB 25.

The COFs 24 have a same arrangement as the COFs 12 except that the COFs 24 further include test wiring sections 26. The test wiring sections 26 are provided further closer to the side end than the short-circuit wires 15 of the aforementioned COFs 12. The test wiring sections 26 are made of two wires 26a and 26b provided parallel to each other.

The display panel 23 has a same arrangement as the display panel 11 except that the display panel 23 further has short-circuit wires 27. The short-circuit wires 27 are provided as similar to the short-circuit wires 21, so as to short-circuit the wires 26a and 26b.

The PWB 25 has a same arrangement as the PWB 16 expect that the PWB 25 further has a test wiring section 28. The test wiring section 28 includes wires 28a and 28b and a wiring group 28c, 28d, and 28e, and is connected to the test wiring sections 26 such that a similar relationship as the connection between the test wiring section 18 and the test wiring sections 14 is established. In addition, the test wiring sections 26 has terminals TZ1 and TZ2 provided for each of the COFs 24, which terminals TZ1 and TZ2 function as similar to the foregoing terminals TX1 and TX2.

In the arrangement, use of a wiring path including the test wirings 26 and 28 and the short-circuit wires 27 allows conducting a similar test to the aforementioned electrical test and resistance measurement test, which electrical test and resistance measurement test passes a signal through the wiring path made of the test wiring sections 14 and 18 and the short-circuit wires 21. Thus, it is possible to assume (i) a breakage on both of side ends of the COFs 24 on which stress is readily applied and (ii) a connection state between the display panel 23 and the COFs 24 and/or a connection state between the COFs 24 and the PWB 25, during use of a display apparatus including the arrangement of the present modification.

The present embodiment explains an arrangement in which the test wiring sections 14 and the short-circuit wires 15 are provided in a vicinity of both side edges of the COFs 12 and 24, respectively. However, if there is a limitation to a layout of a pin in the COFs 12 and 24, just either one of the test wiring sections 14 or the short-circuit wires 15 may be provided.

Moreover, in the present embodiment, further dummy wires 41 and 42 may be provided to the COFs 12 and 24, as illustrated by alternate long and short dash lines in FIGS. 3 and 5. The dummy wires 41 are provided between the test wiring sections 14 and one side edge of the COFs 12 and 24. Each of the dummy wires 42 are provided between the short-circuit wires 15 and the other side edge of the COFs 12 and 24.

The dummy wires 41 and 42 are usually provided as independent wires that are not electrically connected to any wires of the display panels 11 and 23 or to any external wires. Such dummy wires 41 and 42 function so as to reinforce the COFs 12 and 24. Thus, it is possible to reinforce strength of both side edges of the COFs 12 and 24.

The dummy wires 41 and 42 can be electrically connected to the display panels 11 and 23 or the PWB 16 and 25, if necessary.

Third Embodiment

Figure 6:
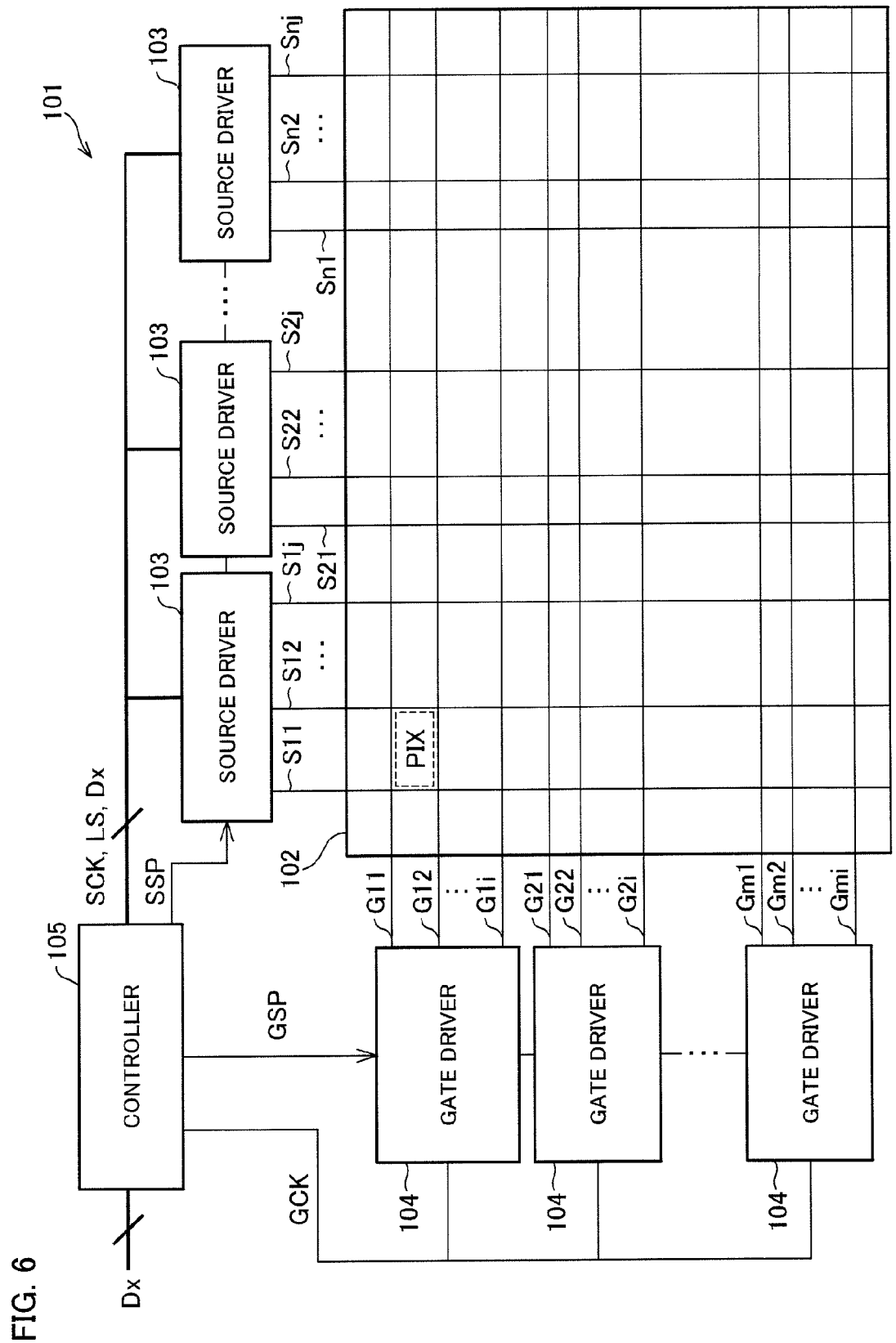
FIG. 6

FIG. 6 illustrates an arrangement of a liquid crystal display device 101 according to the present embodiment.

As illustrated in FIG. 6, the liquid crystal display device 101 includes a liquid crystal display panel 102, a plurality of source drivers 103, a plurality of gate drivers 104, and a controller 105.

The liquid crystal display panel 102 includes a plurality (m×i lines) of gate bus lines G11 to Gmi, a plurality (n×j lines) of source bus lines S11 to Snj, and a plurality of pixels PIX.

In explanations that follow, "gate bus lines G" denotes all of the gate bus lines G11 to Gmi as appropriate, when an explanation is made with respect to all of the gate bus lines G11 to Gmi. Similarly, "source bus lines S" denotes all of the source bus lines S11 to Snj as appropriate, when an explanation is made with respect to all of the source bus lines S11 to Snj.

The pixels PIX are provided in the vicinity of intersecting parts of the gate bus lines G and the source bus lines S. The pixels PIX has a thin film transistor (hereinafter referred simply as transistor) and a display element provided on a glass substrate of the liquid crystal display panel 102.

Gates of the transistors are connected to the gate bus lines G. Sources of the transistors are connected to the source bus lines S. Further, drains of the transistors are connected to pixel electrodes (not illustrated). A common electrode (not illustrated) is provided so as to face the pixel electrodes. A common voltage is applied to this common electrode. The display element is made of the pixel electrodes, the common electrode, and liquid crystal provided between the electrodes.

The gate bus lines G11 to Gmi, the source bus lines S11 to Snj, the transistors and the pixel electrodes are formed on the glass substrate. The common electrode is provided on another glass substrate provided so as to face the glass substrate on which the gate bus lines G, the source bus lines S, the transistors and the pixel electrodes are formed. Accordingly, liquid crystal is injected between the two glass substrates (between the pixel electrodes and the common electrode) so as to fill a space therebetween.

An n number of source drivers 103 are provided in the liquid crystal display device 101. The source drivers 103 cause a start pulse SSP to be transferred by use of a shift register, at a timing of a source clock signal SCK. Thereafter, the source drivers 103 hold display data Dx at a position of corresponding source bus lines S, at a timing of a timing pulse outputted from output stages of the shift register. Moreover, the source drivers 103 read the display data Dx thus held into a latch, at a timing of a latch signal LS, and outputs this display data Dx thus read to a j number of source bus lines S.

An m number of gate drivers 104 are provided in the liquid crystal display device 101. The gate drivers 104 cause a start pulse GSP to be transferred by use of a shift register, at a timing of a gate clock signal GCK, and generates a gate pulse by use of a timing pulse outputted from the output stages of the shift register, so as to output to an i number of gate bus lines G.

The controller 105 generates control signals such as the start pulse SSP, the source clock signal SCK, and the latch signal LS, which are provided to the source drivers 103, and also outputs received display data Dx to the source drivers 103. The controller 105 generates control signals such as the start pulse GSP and the gate clock signal GCK, which are provided to the gate drivers 104.

In the liquid crystal display device 101, the liquid crystal display panel 102 is arranged as the display panel 1, 11, or 23. Moreover, the source drivers 103 and the gate drivers 104 are the driver chips 3 in the arrangement of the display panel 1, the COFs 12 in the arrangement of the display panel 11, or the COFs 24 in the arrangement of the display panel 23. Hence, in a case where the liquid crystal display panel 102 is arranged as the display panel 1, the liquid crystal display panel 102 is to be connected to the FPC 2. Moreover, in a case where the liquid crystal display panel 102 is arranged as the display panel 11, the liquid crystal display panel 102 is to be connected to the PWB 16. Further, in a case where the liquid crystal display panel 102 is arranged as the display panel 23, the liquid crystal display panel 102 is to be connected to the PWB 25.

As such, incorporation of the display panel 1, 11 or 23 in the liquid crystal display device 101 makes it possible to easily assume, during use of the liquid crystal display device 101, (i) a breakage state of the FPC 2 or the PWB 16 or 25, particularly on both end sections of the FPC 2 or the PWB 16 or 25 on which stress is readily applied, and (ii) a connection state between the liquid crystal display panel 102 and the FPC 2 or the PWB 16 or 25.

The present embodiment explains that the display panel 1 of First Embodiment or the display panel 11 or 23 of Second Embodiment are incorporated in the liquid crystal display device 101. However, the display panel 1, 11, and 23 may be incorporated in other display apparatuses such as an organic LE display or a plasma display as long as the display panel 1, 11, and 23 can be driven by use of a driver chip.

Summary of Embodiment

A display panel according to the present embodiment, which is connected to a wiring-mounted board on which signal supply wiring that supplies signals for driving the display panel is mounted, is arranged such that the wiring-mounted board has (i) first and second wires which extend toward the display panel, and (ii) first and second terminals which are connected to the first and second wires, respectively, and the display panel has a first short-circuit wire, which is connected to the first and second wires, at a connecting part of the display panel and the wiring-mounted board, so as to short-circuit the first and second wires.

In the arrangement, first and second wires are connected so as to form one wire via a first short-circuit wire. In such state, it is possible to assume (i) a breakage state of the wiring-mounted board and (ii) a connection state between the display panel and the wiring-mounted board, by inputting a signal from a first terminal and checking a state of the signal that appears at a second terminal. A same assumption can be made by carrying out the following comparison: (i) a normal resistance of the first and second wires connected so as to form one wire is measured between the first and second terminals in advance; and (ii) a resistance of the wiring that is similarly measured at a state in which the wiring has changed over time is compared to the normal resistance.

It is preferable for the display panel to be arranged such that the first and second wires are provided on at least one side end section of the wiring-mounted board. This allows easy assumption of (i) the breakage state of the wiring-mounted board, particularly on both end sections of the wiring-mounted board which easily receive stress, and (ii) a connection state between the wiring-mounted board and the display panel.

Alternatively, it is preferable for the display panel to be arranged such that the display panel is connected to the wiring-mounted board, via an intermediate substrate on which wiring for communicating signals between the wiring-mounted board and the display panel is mounted, and the intermediate substrate has third and fourth wires that cause the respective first and second wires to be connected to the first short-circuit wire. An intermediate substrate is made of, for example, the aforementioned COF. The first and second wires and the first short-circuit wire are caused to be connected via the third and fourth wires; even if the intermediate substrate is present between the wiring-mounted board and the display panel, the first and second wires are connected so as to form one wire. Hence, it is possible to check a state of a signal inputted from the first terminal at the second terminal.

It is preferable for the display panel to be arranged such that the wiring-mounted board has (i) fifth and sixth wires, which extend toward the intermediate substrate, and (ii) third and fourth terminals, which are connected to the fifth and sixth wires, respectively, and the intermediate substrate has a second short-circuit wire which is connected to the fifth and sixth wires, at a connecting part of the intermediate substrate and the wiring-mounted board, so as to short-circuit the fifth and sixth wires. In this arrangement, fifth and sixth wires are connected so as to form one wire, via a second short-circuit wire. In this state, it is possible to easily assume, during use of a display apparatus including the display panel, (i) the breakage state of the wiring-mounted board and (ii) a connection state between the wiring-mounted board and the intermediate substrate. A similar assumption can also be made by the following comparison: (i) a normal resistance of the fifth and sixth wires connected so as to form one wire is measured between the third and fourth terminals in advance; and (ii) a resistance similarly measured in a state in which the wire has changed over time is compared to the normal resistance.

It is preferable for the display panel having the intermediate substrate to be arranged such that the intermediate substrate is made up of a plurality of intermediate substrates, and the display panel is connected to the wiring-mounted board via the plurality of intermediate substrates. Hence, even if there are the plurality of intermediate substrates, it is possible to assume connection states between the wiring-mounted board and the intermediate substrate and between the display panel and the intermediate substrate, for each of the intermediate substrates.

It is preferable for the display panel to be arranged such that the intermediate substrate has a pair of the fifth and sixth wires on both of side end sections of the intermediate substrate.

It is preferable for the display panel to be arranged such that the wiring-mounted board is a printed wiring board, and the intermediate substrate is a mounting substrate on which an integrated circuit for driving the display panel is mounted on a film. This allows assumption of a connection state between a printed wiring board and a mounting substrate that easily receives damage due to stress caused by vibration or the like received for a long term.

A liquid crystal display device according to the present embodiment includes any one of the foregoing display panels.

This thus allows, during use of the liquid crystal display device as a product after the liquid crystal display device has been marketed, assumption of a connection state between the wiring-mounted board and the display panel, and other states, as described above.

A drive-circuit-mounted board according to the present embodiment mounts (i) a semiconductor-integrated circuit that outputs drive signals for driving the display panel (ii) wiring that is connected to the semiconductor-integrated circuit, which drive-circuit-mounted board is connected between the display panel and a wiring-mounted board on which signal supply wiring for supplying, to the semiconductor-integrated circuit, signals causing the semiconductor-integrated circuit to output the drive signals is mounted, the drive-circuit-mounted board further including third and fourth wires causing first and second wires provided on the wiring-mounted board to be connected to a first short-circuit wire provided on the display panel for short-circuiting the first and second wires.

This drive-circuit-mounted board is equivalent to the foregoing intermediate substrates. Thus, the first and second wires and the first short-circuit wire are respectively connected to the third and fourth wires. Hence, as described above, the first and second wires are connected so as to form one wire.

It is preferable for the drive-circuit-mounted board to further include a second short-circuit wire, connected to corresponding fifth and sixth wires provided on the wiring-mounted board, for short-circuiting the fifth and sixth wires. The fifth and sixth wires are caused to connect via a second short-circuit wire; hence, the fifth and sixth wires are connected so as to form one wire as aforementioned.

As described above, a display panel according to the present embodiment is connected to a wiring-mounted board, which wiring-mounted board has (i) first and second wires which extend toward the display panel, and (ii) first and second terminals which are connected to the first and second wires, respectively. In addition, the display panel has a first short-circuit wire which is connected to the first and second wires, at a connection part of the display panel and the wiring-mounted board, so as to short-circuit the first and second wires. Thus, it is possible to electrically check states (whether or not the wires are disconnected, or the like) of the first and second wires that are connected via the first short-circuit wire. Hence, (i) a breakage state of the wiring-mounted board and (ii) a connection state between the display panel and the wiring-mounted board are easily assumed during use of a display apparatus that includes the display panel.

A display panel of the present embodiment allows, by checking a conductivity state of signal wiring to a drive circuit even while the display panel is in use, assumption of a breakage state of a flexible substrate on which such signal wiring is mounted. Hence, the display panel is suitably used for an onboard display apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A drive-circuit where a flexible circuit-mounted board is connected physically and electrically to a display panel and a wiring-mounted board to form a first circuit, wherein:
   the wiring-mounted board has a first test wiring section, comprising first and second terminals, first and second wires, and a first common wire;
   the flexible circuit-mounted board comprises a semiconductor-integrated circuit that outputs drive signals for driving a display panel, supply wiring that is connected to the semiconductor-integrated circuit, and a third and fourth wire which extend toward the display panel and the wiring-mounted board;
   the display panel comprises a plurality of spaced short-circuit wires disposed along an edge of the display panel which extend toward the flexible circuit-mounted board;
   wherein the plurality of spaced short-circuit wires of the display panel connect to the first test wiring section of the wiring-mounted board through the third and fourth wire of the flexible circuit-mounted board;
   wherein said supply wiring supplies, to the semiconductor-integrated circuit, signals causing the semiconductor-integrated circuit to output the drive signals,
   wherein a current may be induced in the first circuit between the first and second terminals, travelling through the first wire, the third wire, a plurality of spaced short-circuit wires, the first common wire, the fourth wire, and the second wire, where an unexpectedly high resistance indicates a degradation in said connection between the wiring-mounted board and the display panel.

2. The drive-circuit as set forth in claim 1, further comprising:
   a second test wiring section comprising third and fourth terminals, a fifth and sixth wire, and a second common wire,
   the flexible circuit-mounted board further comprises a plurality of spaced short-circuit wires along an edge of the flexible circuit-mounted board which extend toward the wiring-mounted board,
   where the plurality of spaced short-circuit wires of the flexible drive-circuit mounted board connect to the second test wiring section,
   a second circuit comprises the second test wiring section connected to each of the plurality of spaced short-circuit wires on said flexible drive-circuit mounted board, wherein an electrical signal may be sent between the third and fourth terminals, through the fifth wire, a plurality of spaced short-circuit wires, the second common wire, and the sixth wire, where an unexpected resistance indicates a degradation in said connection between the wiring-mounted board and the display panel.

3. An electrical panel connection system, where a first electrical panel structure is connected physically and electrically to a second electrical panel structure to form a first circuit, further comprising:
   the second electrical panel structure has a first test wiring section comprising first and second terminals, first and second conductive paths, and a first common conductive path;
   the first electrical panel structure has a plurality of spaced short-circuit conductive paths disposed along an edge of the first electrical panel structure which extend toward the second electrical panel structure;
   where each of the plurality of spaced short-circuit conductive paths of the first electrical panel structure connect to the first test wiring section of the second electrical panel structure;
   the first circuit comprises the first test wiring section connected to each of the plurality of spaced short-circuit conductive paths, where an electrical signal may be sent between the first and second terminals, through the first conductive path, a plurality of short-circuit conductive paths, the common conductive path, and the second conductive path, wherein an unexpected resistance indicates a degradation in the connection between the first and second electrical panel structures.

4. The electrical panel connection system of claim 3, wherein:
   the second electrical panel structure further comprises intermediate terminals, disposed in the first test wiring section on opposite sides of a connection to one of said spaced short-circuit conductive paths of the first electrical panel structure;
   where the intermediate terminals can be used to send an electric current between the intermediate terminals through said one short-circuit conductive path whereby an unexpected resistance indicates a degradation in the connection.

5. The electrical panel connection system as set forth in claim 3, where the second electrical panel structure includes the first test wiring section disposed on both side end sections of the second electrical panel structure where said second electrical panel structure connects to the first electrical panel structure.

6. The electrical panel connection system of claim 3, where a third electrical panel structure is connected to the first and second electrical panel structures to form a second circuit, further comprising:
- a second test wiring section comprising third and fourth terminals, a third and fourth conductive path, and a second common conductive path;
- the third electrical panel structure has a plurality of spaced short-circuit conductive paths disposed along an edge of the third electrical panel structure which extend toward the first electrical panel structure;
- the first electrical panel structure has a plurality of intermediate conductive paths;
- where the plurality of spaced short-circuit conductive paths of the third electrical panel structure connect to the second test wiring section through the intermediate conductive paths of the first electrical panel structure connect to and;
- the second circuit comprises the second test wiring section connected to each of the plurality of spaced short-circuit conductive paths on said third electrical panel structure through the intermediate conductive paths on said first electrical panel structure, where an electrical signal may be sent between the third and fourth terminals, through the third conductive path, a plurality of short-circuit conductive paths, a plurality of intermediate conductive paths, the second common conductive path, and the third conductive path, wherein an unexpected resistance indicates a degradation in the connection between the first and third electrical panel structures.

7. The electrical panel connection system of claim 6, wherein:
- the second electrical panel structure further comprises intermediate terminals, disposed in the second test wiring section on opposite sides of a connection to one of said spaced short-circuit conductive paths of the third electrical panel structure;
- wherein the intermediate terminals can be used to send an electric current through said one short-circuit conductive path, whereby an unexpected resistance indicates a degradation in the connection.

8. The electrical panel connection system as set forth in claim 6, wherein the first electrical panel structure comprises a plurality of electrical panel structures.

9. The electrical panel connection system as set forth in claim 6, wherein portions of the second test wiring section are disposed on the second electrical panel structure.

10. The electrical panel connection system as set forth in claim 6, wherein the first electrical panel structure is flexible and connects second and third electrical panel structures.

* * * * *